United States Patent

[11] 3,608,850

[72] Inventor Charles G. Fredericks
    Silver Spring, Md.
[21] Appl. No. 861,361
[22] Filed Sept. 26, 1969
[45] Patented Sept. 28, 1971
[73] Assignee Occidental Aircraft Corporation
    Washington, D.C.

[54] LIFTING BODY BOUNDARY LAYER CONTROL
    8 Claims, 3 Drawing Figs.
[52] U.S. Cl............................................ 244/36,
    244/42 CC
[51] Int. Cl...................................... B64c 21/02
[50] Field of Search........................... 244/36, 42,
    42.41, 12, 13, 15

[56] References Cited
    UNITED STATES PATENTS
2,372,250   3/1945   Burnelli........................ 244/36 X
2,685,420   8/1954   Burnelli et al. ................ 244/36 X
2,994,493   8/1961   Hartman ....................... 244/36 X
3,018,987   1/1962   Multhopp....................... 244/42 X
3,126,169   3/1964   Kucher.......................... 244/36 X
3,285,538  11/1966   Burnelli......................... 244/36
3,317,161   5/1967   Sawyer.......................... 244/36

Primary Examiner—Milton Buchler
Assistant Examiner—Carl A. Rutledge
Attorney—Littlepage, Quaintance, Wray & Aisenberg ABSTRACT: A twin boom lifting body fuselage aircraft has airflow control ports adjacent leading and trailing edges of the airfoil lifting body. Preferred embodiments have interconnected ram air intake means in fuselage booms and air outlets along a trailing edge of a horizontal stabilizer. An engine mounted in a channel section of the horizontal stabilizer produces a low pressure area near the upper trailing portion of the lifting body promoting flow through the air control ports, thereby reducing drag and increasing lift of the aircraft.

PATENTED SEP 28 1971 3,608,850

INVENTOR
CHARLES G. FREDERICKS

BY James C. Wray
ATTORNEYS

LIFTING BODY BOUNDARY LAYER CONTROL

BACKGROUND OF THE INVENTION

At the time of the present invention short takeoff and landing aircraft are receiving attention from the public, industry and government agencies. Heavy air traffic, the noise associated with large, especially jet, aircraft, and long runways required for streamlined long distance aircraft have made close in city airports impractical. On the other hand, long distances between large airports and the cities which they serve has made short and medium range intercity air travel impractical. Thus, at the time of this invention two types of airports are developing: long runway airports are being planned at distances from cities which they serve, for economy of space and for noise abatement; short landing strips are being provided in or immediately adjacent city centers to facilitate short range aircraft which have short takeoff and landing attributes.

Much work is now being done on designing high-lift and high-load aircraft for lifting as many passengers as possible with a short takeoff and landing runs. Some of the characteristics of short takeoff and landing aircraft which make them highly desirable for small inner city airports are noted. Short takeoff and landing aircraft takeoff, fly and land at speeds lower than large streamlined aircraft, allowing the new aircraft to operate from short runways. The aircraft achieve flying altitude and descend much more rapidly than their counterpart large aircraft, thereby reducing noise in areas near runways. The new aircraft fly in their own separate corridors, avoiding heavy airways and landing and taking off traffic near major air terminals.

Almost without exception, short takeoff and landing aircraft which are being designed today to fulfill the new requirements of close in airports are being planned along the lines of conventional aircraft. In many cases, the new aircraft simply represent backward steps in technology. In many cases, short takeoff and landing aircraft simply have unstreamlined the aircraft, and in many cases the new aircraft have met the high-lift requirements of short takeoff simply by increasing drag and increasing the power required in the aircraft.

SUMMARY OF THE INVENTION

The present invention provides an aircraft having a high-load, high-lift airfoil fuselage with improved lift and reduced drag characteristics due to boundary layer control. The aircraft of a preferred embodiment of the present invention has a rectangular planform lifting body which has a chord greater than its thickness and which has a span greater than its thickness. Together with its laterally extended wings, the lifting body of the present conformation approaches an elliptical planform, which is highly desirable from a lift/drag consideration. For stabilization of the craft and to promote streamlined aerodynamic flow with high lift and low drag, twin booms of an empennage extend rearwardly and upwardly from spanwise extremities of a trailing edge of a lifting body fuselage. A relatively large horizontal stabilizer is connected to the rearward and upward ends of the booms, remote from the fuselage. Twin vertical stabilizers are connected at spanwise extremities of the horizontal stabilizer. As is conventional, the wings are provided with ailerons, the horizontal stabilizer is provided with an elevator, and the vertical stabilizers are provided with rudders. All of the control services are provided with trim tabs in conventional manner.

Nose slats may be provided on the lifting body fuselage as described in copending application Ser. No. 805,185, filed Mar. 7, 1969, by Charles G. Fredericks. The horizontal stabilizer may be configured with a central channel in which an engine is disposed according to the teachings of patent application Ser. No. 832,768, filed June 12, 1969, by Charles G. Fredericks.

Boundary layer control is provided by airflow control ports in the leading edge of the lifting body fuselage and air control ports in an upper surface of the trailing portion of the lifting body fuselage. Internal passageways connect the airflow control ports. Ram air intakes are provided in engine nacelles which extend forwardly from spanwise extremities of the lifting body fuselage. Similar ram air intakes are provided in upper surfaces of the empennage booms, and air is exhausted rearwardly from a trailing edge of the horizontal stabilizer.

In a preferred embodiment a series of parallel slits is provided in a trailing portion of an upper surface of the lifting body fuselage. Air from intakes in the leading edge of the fuselage and from the ram air intakes is forced through a venturi to create suction in the forwardmost of the parallel slits. The airflow may then continue rearwardly through the booms, wherefrom air is finally exhausted through the trailing edge of the horizontal stabilizer. Preferably, air is exhausted from the rearmost parallel slits, and the continuation of the accelerated streamline flow across the upper surface of the lifting body fuselage is effected by the drawing of air away from that surface by the engine mounted on the horizontal stabilizer. When no external air propelling device is employed at the rear of the aircraft, it is preferable to use all of the airflow control ports near the trailing edge as intake ports, employing the ram air intakes on the booms in venturis to draw the air rearwardly and to exhaust the air near the extreme after edge of the aircraft.

In another embodiment of the invention, all of the parallel slits in the upper surface of the aircraft fuselage are employed as exhaust ports, and the empennage mounted engine draws upon the air flowing through the slit ports as well as the air flowing over the upper surface of the fuselage to promote streamlined flow, reducing drag and enhancing lift of the fuselage. Controls are provided internally to open and close the airflow control ports and to connect the slits with the air passage means either as intake or as exhaust ports.

DETAILED DESCRIPTION OF THE DRAWINGS

Figure 1:
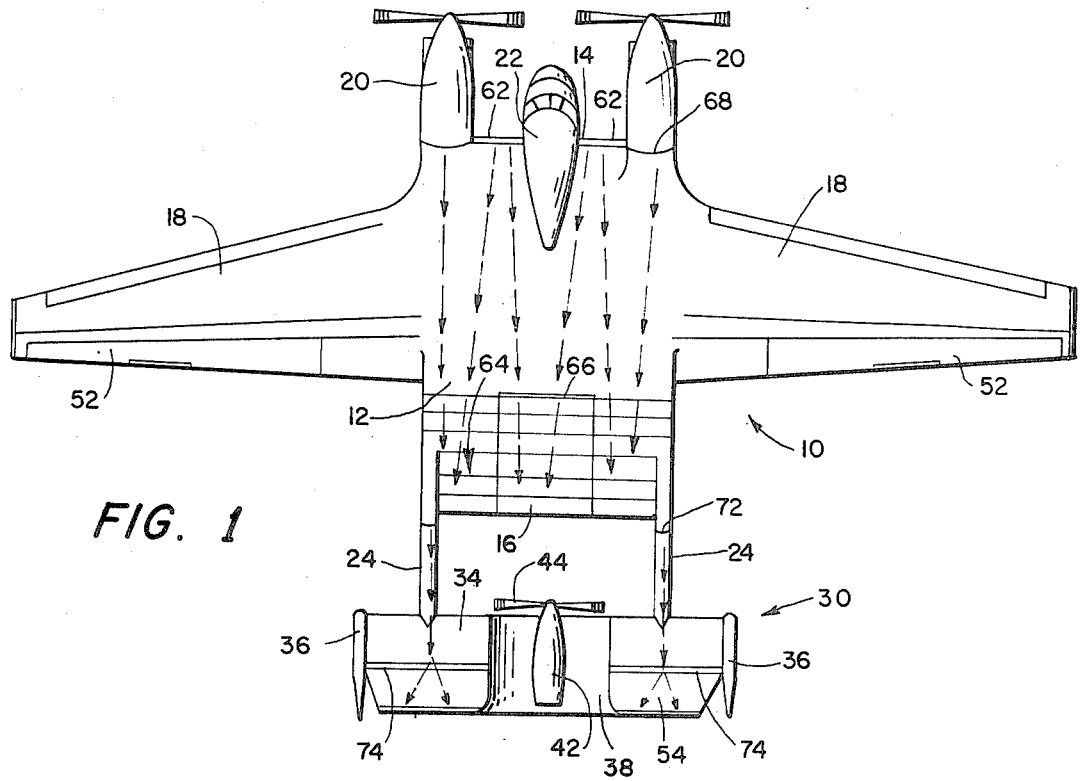
FIG. 1 is a top plan view of an aircraft constructed according to this invention.
Figure 2:
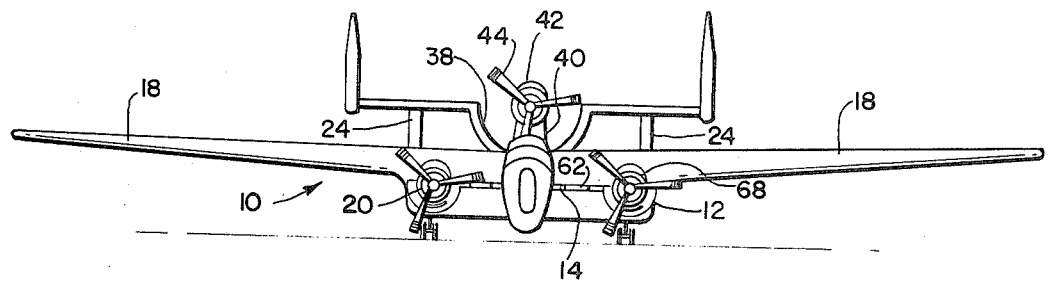
FIG. 2 is a front elevational view of the aircraft of FIG. 1.
Figure 3:
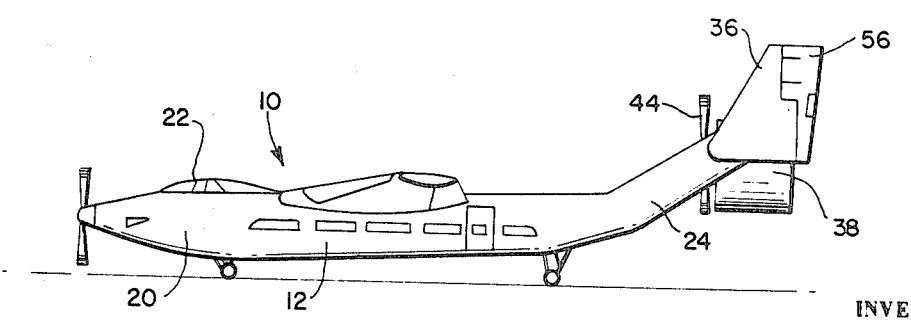
FIG. 3 is a side elevational view of the aircraft of FIGS. 1 and 2.

In FIGS. 1, 2 and 3 of the drawings, a lifting body fuselage aircraft is generally referred to by the numeral 10. The airfoil fuselage portion of the aircraft is generally referred to by the numeral 12. The cord distance between leading edge 14 and trailing edge 16, as best shown in FIG. 1, is greater than the thickness of the airfoil fuselage section, as best shown in FIG. 2. Fuselage 12 defines a generally rectangular planform. Wings 18, which extend laterally from upper lateral portions of the lifting body complete an airfoil composite which is designed to approximate a highly elliptical planform. Together wings 18 and the lifting body 12 approach the highly desirable elliptical planform configuration. Twin engine nacelles 20 extend forwardly from spanwise extensions of the fuselage 12. Turbine-driven propeller engines which develop approximately 5,000 shaft horsepower each are employed throughout the aircraft. A cockpit 22 is provided between and above the engine nacelles well behind the propellers.

Twin booms 24 of empennage 30 extend rearward and upward from rear spanwise extremities of the lifting body fuselage 12. A horizontal stabilizer 34 extends between and outward beyond the rearward ends of twin booms 24. At the spanwise extremities of horizontal stabilizer 34, twin vertical stabilizers 36 are mounted. In a preferred embodiment of the invention, horizontal stabilizer 34 is provided with a central semicircular channel section 38 and an engine mounting 40 centered within the semicircular channel 38 supports a 5,000 shaft horsepower turbine-driven propeller engine 42. Propeller 44 may be mounted adjacent a leading edge of channel 38, or the propeller may be mounted rearwardly, adjacent the trailing edge.

As is conventional, wings 18 are provided with ailerons 52; horizontal stabilizer 34 is provided an elevator 54, and vertical stabilizers 36 are outfitted with rudders 56. All control surfaces are provided with trim tabs in a conventional manner.

Air control ports 62 and 64 are provided in the leading edge and in a rearward upper surface of the lifting body fuselage near trailing edge 16. Internal air passages within the aircraft link the air control ports 62 and 64.

In a preferred embodiment of the invention, air rushes in through ports 62 from the propeller backwash, as well as from the forward speed of the aircraft. Control air flows through the internal passages past the forwardmost slits 66 of the parallel rear slits 64. A venturi effect draws air inwardly in slits 66, and the air continues through the passages until it is exhausted rearwardly through slits in the trailing edge or through the most rearward of the slits 64. Ram air entering through intakes 68 in engine nacelles 20 is fed to the same air passage and is used to further promote the venturi effect in the leading slits 66. This embodiment of the invention provides useful, uniform streamline flow over the lifting body fuselage foil in configurations of the aircraft without the empennage-mounted propulsion means, as well as in configurations in which there is an engine mounted in the empennage. In both modifications, it is further useful to accept air in ram intakes 72 on upper surfaces of the twin booms 24 and to flow that air through exhaust ports 74 along the trailing edge of the horizontal stabilizer. Control air passageways in the lifting body 12 may be interconnected with passageways in the twin booms and horizontal stabilizer so that the ram air in the booms further operates a venturi effect to produce suction on all of the parallel slits 64 near the trailing edge 16 of the lifting body.

When engine 42 is employed in the preferred modification of the aircraft, the air passageways may be configured so that air flows outward through all of the parallel slits 64 in the upper surface of the airfoil fuselage. The control air flowing out of slits 64 is immediately picked up and continued in streamline flow across the surface of the fuselage by the action of propeller 44 which promotes and continues the streamline flow, reducing the drag of the aircraft, and enhancing its lift.

The following claims with more particularity precisely described that which is claimed as the invention:

1. In a lifting body aircraft having an airfoil body with a chord greater than the thickness of the body and with a span of the body greater than the thickness of the body improved airflow control apparatus comprising:
first air control ports in the lifting body adjacent a leading edge of the lifting body,
second airflow control ports adjacent the trailing edge of the lifting body,
an air control passage means within the lifting body interconnecting the first and second air control ports.

2. The apparatus of claim 1 wherein the second air control ports comprise boundary layer intake port means on an upper surface of the lifting body spaced from the trailing edge thereof and boundary layer air outlet port means immediately adjacent the trailing edge of the lifting body and where the first air control port means comprise intake port means in a leading edge of the lifting body and wherein the air passage means innerconnects the first port means and the boundary layer exhaust means via the boundary layer intake means whereby air flowing through the passage means draws air into the intake means.

3. The apparatus of claim 1 further comprising empennage means connected to the lifting body means, the empennage means having airfoil control bodies having air exhaust port means adjacent trailing edges thereof,
wherein the second air control port means in the lifting body comprise boundary layer air intake means and where the passage means further interconnects the second air control port means with the air exhaust means in the empennage airfoil control bodies.

4. The apparatus of claim 3 further comprising ram air intake means in the empennage, and wherein the air passage means further connects the ram air intake means with the boundary layer control intake means in the lifting body and air exhaust means in the empennage whereby the air intake means in the empennage imparts energy to the air passage for drawing air in through the boundary layer control intake means.

5. The apparatus of claim 1 wherein the lifting body is provided with auxiliary airfoil sections which together with the lifting body comprise an aircraft, and wherein the apparatus further comprises propulsion means externally mounted on the aircraft for facilitating airflow across a trailing portion of an upper surface of the lifting body and thereby drawing air out of the second port means.

6. The apparatus of claim 5 wherein the auxiliary airfoil control surfaces include an empennage, and wherein the propulsion means is mounted on the empennage 7. The apparatus of claim 6 wherein the aircraft empennage includes parallel booms extending rearwardly from spanwise spaced portions of the lifting body and a horizontal stabilizer interconnecting rear portions of the parallel boom, and wherein the propulsion means is mounted on the horizontal stabilizer.

8. The apparatus of claim 1 further comprising auxiliary lifting and control airfoil bodies connected to the lifting body, the bodies including an empennage comprising parallel twin booms connected at opposite spanwise extremities of a trailing edge of the lifting body and extending rearwardly therefrom and a horizontal stabilizer means interconnecting rearward ends of the twin booms, the horizontal stabilizing means having a central downward extending semicircular portion with a propulsion engine mounted centrally in the semicircular portion, whereby the propulsion engine draws ambient air from rearward portions of the second air control port means near the trailing edge of the lifting body.